(12) United States Patent
Shimizu et al.

(10) Patent No.: US 6,929,760 B2
(45) Date of Patent: Aug. 16, 2005

(54) METHOD FOR PRODUCING A POLYMER OPTICAL WAVEGUIDE AND LAMINATED POLYMER OPTICAL WAVEGUIDE WITH AN ALIGNMENT MARK

(75) Inventors: Keishi Shimizu, Ashigarakami-gun (JP); Shigemi Ohtsu, Ashigarakami-gun (JP); Kazutoshi Yatsuda, Ashigarakami-gun (JP); Eiichi Akutsu, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 124 days.

(21) Appl. No.: 10/414,200

(22) Filed: Apr. 16, 2003

(65) Prior Publication Data

US 2004/0022499 A1 Feb. 5, 2004

(30) Foreign Application Priority Data

Aug. 1, 2002 (JP) ........................................ 2002-224642

(51) Int. Cl.[7] .......................... B29D 11/00; G02B 6/18; B29C 33/40; B28B 7/22
(52) U.S. Cl. ...................... 264/1.24; 264/220; 264/255; 264/259; 385/141
(58) Field of Search .............................. 264/1.24, 220, 264/255, 259, 299, 330; 385/141

(56) References Cited

U.S. PATENT DOCUMENTS 5,375,184 A * 12/1994 Sullivan ...................... 385/129
6,355,198 B1 * 3/2002 Kim et al. .................. 264/259
6,744,953 B2 * 6/2004 Lemoff et al. ................ 385/52
2003/0081902 A1 * 5/2003 Blauvelt et al. .............. 385/50

FOREIGN PATENT DOCUMENTS

JP      B2 3151364      1/2001
JP      A 2002-187473      7/2002

OTHER PUBLICATIONS

Whitesides et al., "The Art of Building Small", Scientific American, Sep. 2001, pp 39–47.
Michel et al., "Printing meets lithography: Soft approaches to high-resolution patterning", IBM J. Res. & Dev., vol. 45 No. 5, Sep. 2001, pp. 697–719.

* cited by examiner

Primary Examiner—Frank G. Font
Assistant Examiner—Charlie Peng
(74) Attorney, Agent, or Firm—Oliff & berridge, PLC

(57) ABSTRACT

The invention provides a method for producing a polymer optical waveguide equipped with a plurality of alignment marks (AM), which comprises bringing a film substrate into contact with a mold having concave portions corresponding to convex portions for the optical waveguide and convex portions for a plurality of AMs, introducing a curable resin from an end of the mold into concave portions, curing the resin, peeling the mold, and forming a cladding layer on a core/AM-forming surface, or bringing a film substrate into contact with the mold having concave portions corresponding to convex portions for the optical waveguide and notches, introducing the curable resin from an end of the mold into the concave portion, curing the resin, applying a material for AM to the film substrate through the notches and, thereafter, forming the cladding layer on the core/AM-forming surface.

8 Claims, 5 Drawing Sheets

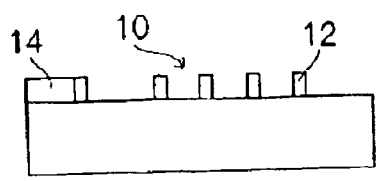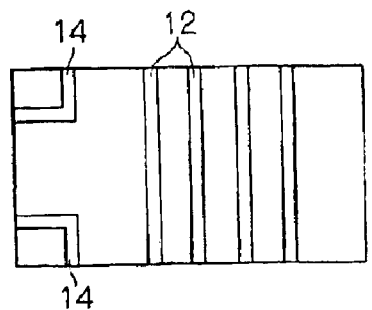
FIG. 1A-1   FIG. 1A-2
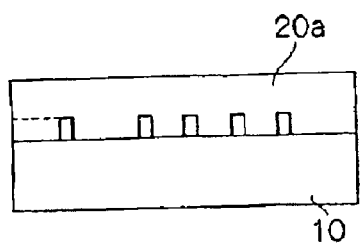
FIG. 1B
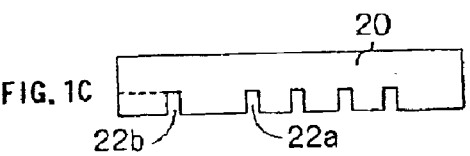
FIG. 1C
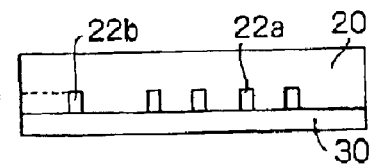
FIG. 1D
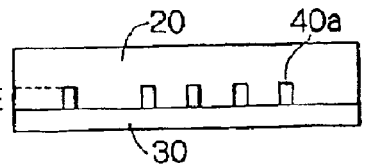
FIG. 1E
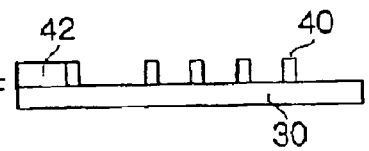
FIG. 1F
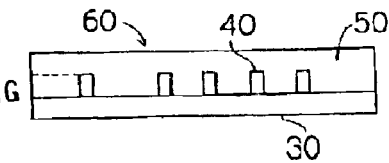
FIG. 1G

METHOD FOR PRODUCING A POLYMER OPTICAL WAVEGUIDE AND LAMINATED POLYMER OPTICAL WAVEGUIDE WITH AN ALIGNMENT MARK

BACKGROUND OF THE INVENTION

1. Field of the Invention

The present invention relates to a method for producing an optical waveguide, and, more particularly, a method for producing a flexible polymer optical waveguide and a laminated polymer optical waveguide, both equipped with a plurality of alignment marks.

2. Description of the Related Art

As methods for producing a polymer waveguide, conventionally there is produced (1) a process of saturating a film with a monomer, selectively exposing a core part to light in order to change a refractive index, and laminating films (selective polymerizing process); (2) a process of coating a core layer and a cladding layer, and forming a cladding part using a reactive ion etching (RIE process); (3) a process of using a photolithography method of performing exposure to light and development using an ultraviolet ray-curable resin in which a photosensitive material is added to a polymer material (direct exposing process); (4) a process of utilizing injection molding; and (5) a process of coating a core layer and a cladding layer, and exposing a core part to light in order to change a refractive index of the core part (photobleaching process). These are several representative examples of wavelength producing methods.

However, the selective polymerizing process of (1) has a problem in film laminatio, and processes of (2) and (3) are expensive due to the use of photolithography methods, and process (4) is problematic in the precision of the diameter of the resulting core. In addition, a process of (5) has a problem that a sufficient difference in refractive indices between a core layer and a cladding layer can not be obtained.

Currently, of the above process, only (2) and (3), are both practical and excellent in performance, however, as mentioned above, they are problematic in that they are costly. Further, none of the processes (1) to (5) are suitable for forming a polymer waveguide on a flexible plastic substrate having a large area.

In addition, a method for producing a polymer optical waveguide is known where by filling a polymer precursor material for a core into capillary grooves formed on a patterned substrate (cladding), and thereafter curing the material to form a core layer, and laminating a planar substrate (cladding) thereon. However, this process has a drawback in that the polymer precursor material is filled thinly not only in the capillary grooves but also entirely between the patterned substrate and the planar substrate, causing the formation of a thin layer having the same composition as that of the core layer and, as a result, light leaks thorough this thin layer.

In order to solve this problem, David Hart proposed a method for producing a polymer optical waveguide by claimping a capillary groove-patterned substrate to a planar substrate with a clamping jig, sealing their contacting parts with a resin, and reducing the pressure to fill a monomer (diallyl isophthalate) solution into the capillary (Japanese Patent No. 3151364). This process is for reducing the viscosity of the filling material by using, as a core-forming resin material, a monomer instead of a polymer precursor material. Further, by filling the material into the capillaries by utilizing the capillary phenomenon, parts other than the capillary grooves do not get monomer filled or applied thereto.

However, since this process uses a monomer as the core-forming material, the volume shrinking rate upon polymerization of a monomer into a polymer is considerable, and permeation loss in the polymer optical waveguide becomes problematic.

In addition, this process involves complicated steps such as claimping a patterned substrate and a planar substrate with a clamp, or additionally sealing their contacting parts with a resin. Thus, this process is not suitable for large scale production and, as a result, is not practical from the standpoint of cost reduction. Moreover, this process can not be applied to preparation of a polymer optical waveguide using, as a cladding, a film having a thickness of mm scale of or 1 mm or less.

Recently, George M. Whitesides of Harvard University has proposed, as a new technique for making a nanostructure, a soft lithography process called capillary micromolding. This is a process of making a master substrate by utilizing photolithography, transferring a nanostructure of a master substrate onto a mold of polydimethylsiloxane (PDMS) utilizing the adherability and the easy peelability of PDMS, and pouring a liquid polymer into this mold utilizing the capillary phenomenon and solidify the polymer. An article explaining the details is described in *Scientific American*, September 2001 (*Nikkei Science*, December 2001).

Or, Kim Enoch et al. of Harvard's George M. Whitesides group filed a patent application directed to a capillary micromolding method (U.S. Pat. No. 6,355,198).

However, even when the preparing process described in this patent is applied to preparation of a polymer optical waveguide, it is still problematic. This is due to the fact that forming the core part is time consuming due to its small cross-sectional area, so this method is unsuitable for large-scale production. Furthermore, the process has shortcomings in that a change in volume is caused upon polymerization of a monomer solution into a polymer, the shape of the core is changed, and permeability significantly increases.

In addition, B. Michel et al. of IBM's Zürich Laboratory have proposed a high-resolution lithography technique using PDMS, and have reported that a resolving power of dozens of nm can be obtained with this technique. There is an article explaining the details of this techniques in IBM J. REV. & DEV. VOL. 45 No. 5, September 2001.

The above PDMS soft lithography technique and capillary micromolding method are techniques which have recently attracted a lot of attention, mainly in the USA.

However, the aforementioned micromolding method can not satisfy the need to both reduce the volume shrinking rate upon curing (therefore reduce permeation loss) and reduce the viscosity of the filling liquid (monomer, etc.) for easy filling. Therefore, when reducing permeation loss is a priority, since the viscosity of the filling liquid can not be decreased below a certain limit, the filling rate is decreased and large-scale production can not be expected. In addition, the aforementioned micromolding method functions on the premise that a glass or silicon substrate is used as the substrate, and use of a flexible film substrate is not taken into consideration.

In contrast, the present inventors have proposed a method for producing a flexible polymer optical waveguide in which an optical waveguide is provided on a film substrate, at extremely low cost, in Japanese Patent Application No.

2002-187473. A polymer optical waveguide prepared by this process sustain minimal permiation loss and maintains a highly precise core shape and further, since the waveguide is flexible as a whole, it can be freely installed into various apparatuses. In order to increase the degree of circuit integration, structures in which polymer optical waveguides are laminated or laminated on an electric circuit substrate are effective. However, accurate positioning upon lamination of a flexible polymer optical waveguide is quite difficult.

hence, there is a need for an invention that can produce an optical waveguide that provides easy and accurate positioning.

SUMMARY OF THE INVENTION

The present invention was done in view of the aforementioned problems, and an object of the invention is to provide a method for producing a polymer optical waveguide equipped with a plurality of alignment marks for rendering lamination of a polymer optical waveguide easy, and is to provide a method for producing a laminated polymer optical waveguide by lamination utilizing a plurality of alignment marks.

The aforementioned problems can be solved by providing the following method for producing a polymer optical waveguide and method for producing a laminated polymer optical waveguide. That is, one aspect of the invention provides a method for producing a polymer optical waveguide equipped with a plurality of alignment marks, wherein the method comprising:

a step of forming of a mold-forming resin material layer on a master template, which has convex portions for an optical waveguide and convex portions for a plurality of alignment marks formed thereon, peeling the resin material and then cutting both ends of a mold so as to expose concave portions corresponding to convex portions for an optical waveguide and convex portions for alignment marks formed on the mold, to prepare the mold;

a step of bringing a film used for a cladding layer having mold adherability into close contact with the mold;

a step of contacting one end of the mold, with which the film used for the cladding layer is closely brought into contact, with an ultraviolet ray-curable resin or a heat-curable resin that will become a core, and then introducing the ultraviolet ray-curable resin or the heat-curable resin into the concave portions of the mold by capillary phenomenon;

a step of curing the introduced ultraviolet ray-curable resin or heat-curable resin, and peeling the mold from the film used for the cladding layer; and a step of forming the cladding layer on the film used for the cladding layer on which the core is formed.

BRIEF DESCRIPTION OF THE DRAWINGS

FIGS. 1A-2 through 1G are conceptional views showing steps of preparing a polymer optical waveguide equipped with a plurality of alignment marks.

FIG. 2 is a conceptional view showing one example of a step of filling a resin for an optical waveguide and a plurality of alignment marks into concave portions of a mold.

DETAILED DESCRIPTION OF THE PREFERRED EMBODIMENTS

Figure 2:
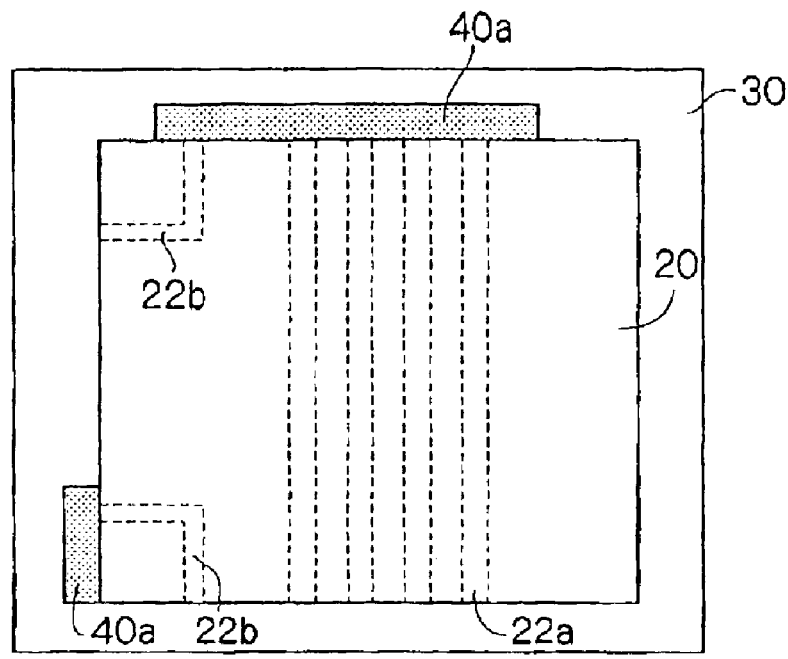

The present invention relates to a method for producing a polymer optical waveguide having a plurality of alignment marks, and a method for producing a laminated polymer optical waveguide obtained by laminating the polymer optical waveguide. In particular, since positioning at contact of a mold with a film substrate is difficult in a micromolding method, it is desirable to integrally mold convex portions for an optical waveguide, and convex portions for a plurality of alignment marks or convex portions for preparing a plurality of alignment marks on a master template itself. A method for producing a polymer optical waveguide having a plurality of alignment marks includes the following two processes.

First Process

The first process has the following 1) to 5) steps:

1) a step of forming of a mold-forming resin material layer on a master template, which has convex portions for an optical waveguide and convex portions for a plurality of alignment marks formed thereon, peeling the resin material and then cutting both ends of a mold so as to expose concave portions corresponding to convex portions for an optical waveguide and convex portions for alignment marks formed on the mold, to prepare the mold;

2) a step of bringing a film used for a cladding layer having mold adherability into close contact with the mold;

3) a step of contacting one end of the mold, with which the film used for the cladding layer is closely brought into contact, with an ultraviolet ray-curable resin or a heat-curable resin that will become a core, and then introducing the ultraviolet ray-curable resin or the heat-curable resin into the concave portions of the mold by capillary phenomenon;

4) a step of curing the introduced ultraviolet ray-curable resin or heat-curable resin, and peeling the mold from the film used for the cladding layer; and 5) a step of forming the cladding layer (meaning a side cladding part and an upper cladding part, same below) on the film used for the cladding layer on which the core is formed.

Second Process

The second process has the following 1) to 6) steps:

(1) a step of forming of a mold-forming resin material layer on a master template, which has convex portions for an optical waveguide and convex portions for a plurality of alignment marks formed thereon, peeling the resin material and then cutting both ends of a mold so as to expose concave portions corresponding to convex portions for an optical waveguide and convex portions for alignment marks formed on the mold, to prepare said mold;

(2) a step of bringing a film used for a cladding layer having mold adherability into close contact with the mold;

(3) a step of contacting one end of the mold, with which the film used for the cladding layer is closely brought into contact, with an ultraviolet ray-curable resin or a heat-curable resin that will become a core, and then introducing the ultraviolet ray-curable resin or the heat-curable resin into the concave portions of the mold by capillary phenomenon;

(4) a step of applying a material for alignment marks to a surface of the film substrate through notches formed on a mold to prepare alignment marks;

(5) a step of curing the introduced ultraviolet ray-curable resin or heat-curable resin, and peeling the mold from the film used for the cladding layer; and (6) a step of forming the cladding layer on the film used for the cladding layer on which the core is formed, wherein any one of the step of (3) and the step of (4) may be performed earlier, and the step of (4) may be performed before the curing step of (5).

In preparation of a polymer optical waveguide equipped with a plurality of alignment marks of the invention, since it is enough that a master template in which the same convex portion for an alignment as the convex portion for an optical waveguide is used (first process), or a notch is provided on a mold (second process), a complicated step for preparing a plurality of alignment marks is not necessary. Since a polymer optical waveguide prepared by the invention has a plurality of alignment marks attached thereto, a polymer optical waveguide can be laminated at a small error.

Further, a method for producing a polymer optical waveguide of the invention is based on the finding that, when a film used for a cladding layer having the better adherability with a mold is brought into close contact with the mold, even if both are not adhered using special means (for example, adhering means described in the aforementioned Patent No. 3151364), an ultraviolet ray-curable resin or a heat-curable resin can be introduced only into concave portions formed on a mold without generating a gap between a mold and a film used for a cladding layer, at a position other than the concave structure formed on the mold. A method for producing a polymer optical waveguide of the invention has an extremely simplified preparing step, can easily prepare a polymer optical waveguide, and enables a polymer optical waveguide to be prepared at the extremely low cost as compared with the previous method for producing a polymer optical waveguide. In addition, according to a method for producing a polymer optical waveguide of the invention, a flexible polymer optical waveguide which is small in the loss, has a high precision, and can be arbitrarily installed in various apparatuses is obtained, and a shape of a polymer optical waveguide can be arbitrarily set.

First, outline of a first method for producing a polymer optical waveguide with a plurality of alignment marks of the invention will be explained using FIG. 1.

In FIGS. 1A-1 to 6, 10 denotes a master template, 12 denotes convex portions for an optical waveguide, 14 denotes convex portions for a plurality of alignment marks, 20a denotes a layer of a mold-forming resin material, 20 denotes a mold, 22a denotes concave portions of a mold for preparing of an optical waveguide, 22b denotes concave portions of a mold for preparing a plurality of alignment marks, 27 denotes a notch, 30 denotes a film used for a cladding layer, 40a denotes a curable resin for a core, 40 denotes a core, 42 denotes a plurality of alignment marks, 50 denotes a cladding layer, 60 denotes a polymer optical waveguide, 62 denotes a laminated polymer optical waveguide, 70 denotes a plane emitting laser array, 71 denotes a semiconductor laser device, and 80 denotes a printed substrate, respectively.

FIGS. 1A-1 shows a master template 10 on which convex portions 12 for an optical waveguide and convex portions 14 for a plurality of alignment marks are formed. First, as shown in FIG. 1B, a layer 20a of a mold-forming resin material (e.g. layer of a cured curable resin) is formed on the surface of a master template 10 on which convex portions 12 for an optical waveguide and convex portions 14 for a plurality of alignment marks are formed. Then, a layer 20a of a mold-forming resin material is peeled from a master template 10 (molding) and, thereafter, both ends of a mold are cut so as to expose concave portions 22a corresponding to convex portions for an optical waveguide and concave portions 22b corresponding to convex portion 14 for a plurality of alignment marks which are formed on a mold (not shown), to prepare a mold 20 (see FIG. 1C).

To the thus prepared mold is closely brought into contact with a film used for a cladding layer 30 having the adherability with mold (see FIG. 1D). Then, one end of mold is contacted with a curable resin 40a which is to be a core and a plurality of alignment marks, to introduce the resin into concave portions 22a and 22b utilizing the capillary phenomenon. FIG. 1E shows the state where a curable resin is filled in concave portions of a mold. Thereafter, a curable resin in concave portions is cured, and a mold is peeled (not shown). As shown by FIG. 1F, convex portions for an optical waveguide (core) 40 and a plurality of alignment marks 42 are formed on a film used for a cladding layer.

Further, by forming a cladding layer 50 on a core-formed surface of a film used for a cladding layer, a polymer optical waveguide 60 of the invention (see FIG. 1G) is prepared.

A first method for producing a polymer optical waveguide equipped with a plurality of alignment marks of the invention will be explained in a step order below.

1) A step of forming a layer of a mold-forming resin material on a master template on which convex portions for an optical waveguide and convex portions for a plurality of alignment marks are formed, peeling the resin material to form a mold and, then, cutting both ends of a mold so as to expose concave portions corresponding to convex portions for an optical waveguide and convex portion for an alignment formed on the mold, to prepare a mold.

Preparation of Master Template

For preparing a master template on which convex portions for an optical waveguide (convex portion corresponding to a core) and convex portion for alignment marks are formed, the previous method, for example, a photolithography method can be used without any limitation. In addition, a method for producing a polymer optical waveguide by an electrodeposition method or a photoelectrodeposition method which was earlier filed by the present applicant (Japanese Patent Application No. 2002-10240) can be also applied to a preparation of master template. A size of convex portions for an optical waveguide formed on a master template can be appropriately determined depending on use of a polymer optical waveguide and the like. For example, in the case of a single mode optical waveguide, a core of around 10 $\mu$m square is generally used and, in the case of a multiple mode optical waveguide, a core of around 50 to 100 $\mu$m square is generally used. However, an optical waveguide having a further larger core part of around a few hundreds $\mu$m is utilized depending on utility.

In addition, convex portions for a plurality of alignment marks having the same shape and size as those of a plurality of alignment marks which is to be attached to a photomask for positioning the photomask can be applied. For example, there can be exemplified a planer shape as shown in the above FIG. 1A-2, being not limiting. It is necessary that two or more, suitably around two or three convex portions for alignment marks are formed.

Preparation of Mold

A mold is prepared by forming a layer of a mold resin material on an optical waveguide surface of the master template prepared as described above and, thereafter, peeling the material.

It is preferable that a mold resin material can be easily peeled from a master template, and has the mechanical strength and the dimensional stability greater than a prescribed level as a mold (which is used repeatedly). A layer of a mold resin material is formed of a mold-forming resin or the resin to which various additives are added as necessary.

Since a mold-forming resin must precisely transfer individual optical waveguides formed on a master template, it is preferable that the resin has the viscosity smaller than a prescribed limit, for example, the viscosity of around 2000 to 7000 mPa·s. In addition, in order to regulate the viscosity, a solvent may be added to such an extent that the solvent has no adverse effect thereon.

As the mold-forming resin, a curable silicone resin (heat-curing type, room temperature curing type) is preferably used from a viewpoint of the peelability, the mechanical strength and the dimensional stability. In addition, a liquid resin which is the aforementioned resin and has a low molecular weight is preferably used because the sufficient permeability is expected. The viscosity of the aforementioned resin is preferably 500 to 7000 mPa·s, further 2000 to 5000 mPa·s.

A curable silicone resin containing a methylsiloxane group, an ethylsiloxane group or a phenylsiloxane group is preferable and, in particular, a curable dimethylsiloxane resin is preferable.

In addition, it is desirable that the master template is subjected to releasing treatment such as releasing agent coating in advance to promote peeling from a mold.

For forming a layer of a mold resin material on an optical waveguide surface of a master template, a layer of a mold-forming resin is formed on the surface by a method of coating or casting a mold-forming resin and, thereafter, drying treatment and curing treatment are performed as necessary.

A thickness of a layer of a mold resin material is appropriately determined in view of the handling property and, generally, is suitably around 0.1 to 50 mm.

Thereafter, a layer of a mold resin material and a master template are peeled to form a mold.

Preparation of Mold

Then, both ends of a mold are cut so as to expose concave portions corresponding to convex portions for an optical waveguide formed on the mold, to form a mold. Both ends of a mold are cut so as to expose concave portions, in order to introduce an ultraviolet ray-curable resin or a heat-curable resin into concave portions of the mold by the capillary phenomenon at a later step.

It is preferable from a viewpoint of the adherability with a substrate film that the surface energy of a mold is in a range of 10 dyn/cm to 30 dyn/cm, preferably 15 dyn/cm to 24 dyn/cm.

A Share rubber hardness of a mold is 15 to 80, preferably 20 to 60 from a viewpoint of the molding performance and the peelability.

A surface roughness (route mean square roughness (RMS) of a mold is 0.5 $\mu$m or smaller, preferably 0.1 $\mu$m or smaller from a viewpoint of the molding performance.

2) A step of bringing a film used for a cladding layer having the better mold adherability into close contact with the mold Since an optical waveguide of the invention can be also used as coupler, optical wiring and optical branching filter between boards, a material for the film substrate is selected in view of the optical properties such as a refractive index, the light permeability and the like, the mechanical strength, the heat resistance, the adherability with a mold, the flexibility and the like of the material, depending on the utility.

It is preferable that a polymer optical waveguide having the flexibility is prepared using a flexible film substrate. Examples of the film include an alicyclic acryl film, an alicyclic olefin film, a cellulose triacetate film, a fluorine-containing resin film and the like. It is desirable that a refractive index of a film substrate is smaller than 1.55, preferably smaller than 1.53 in order to maintain the difference in a refractive index between a core.

As the alicyclic acryl film, OZ-1000, OZ-1100 and the like in which aliphatic cyclic hydrocarbon such as tricyclodecane and the like is introduced into an ester substituent are used.

In addition, examples of the alicyclic olefin film include a film having a norbornene structure on a main chain, and a film having a norbornene structure on a main chain and having a polar group such as an alkyloxycarbonyl group (an alkyl group being an alkyl group having a carbon number of 1 to 6 or a cycloalkyl group) on a side chain. Inter alia, the alicyclic olefin resin having a norbornene structure on a main chain and having a polar group such as an alkyloxycarbonyl group on a side chain as described above has the excellent optical properties such as a low refractive index (since a refractive index is around 1.50, a difference in refractive indices between a core and a cladding can be maintained) and the high light permeability, has the excellent adherability with a mold, and has the excellent heat resistance and, therefore, the resin is suitable for preparing a polymer optical waveguide of the invention.

In addition, a thickness of the film substrate is appropriately selected in view of the flexibility and the rigidity, and the easy handling property, and is generally preferably around 0.1 mm to 0.5 mm.

3) A step of contacting one end of a mold with which a film used for a cladding layer is closely brought into contact, with an ultraviolet ray-curable resin or a heat-curable resin which is to be a core, and introducing the ultraviolet ray-curable resin or heat-curable resin into concave portions of the mold by the capillary phenomenon In this step, since an ultraviolet ray-curable resin and a heat-curable resin are filled into a gap formed between a mold and a film substrate (concave portions of a mold) by the capillary phenomenon, it is required that the ultraviolet ray-curable resin and heat-curable resin used have the sufficiently low viscosity in order to attain filling and, additionally, a refractive index of the curable resin after curing is higher than that of a polymer material constituting a cladding (a difference in indices between a core and a cladding is 0.02 or greater). Besides, in order to reproduce an original shape possessed by convex portions for an optical waveguide formed on a master template at a high precision, it is required that a change in a volume of the curable resin before and after curing is small. For example, reduction in a volume is the cause for loss of waveguide. Therefore, the curable resin is desirably has a as small change in a volume as possible, and desirably has the change of 10% or smaller, preferably 6% or smaller. Reduction in the viscosity using a solvent causes a great change in a volume before and after curing, and this reduction is preferably avoided.

Therefore, it is preferable that the viscosity of the curable resin is 10 mPa·s to 2000 mPa·s, desirably 20 mPa·s to 1000 mPa·s, more preferably 30 mPa·s to 500 mPa·s.

In addition, as the ultraviolet ray-curable resin, epoxy series, polyimide series and acryl series ultraviolet ray-curable resins are preferably used.

In addition, in this step, in order to promote filling of an ultraviolet ray-curable resin or a heat-curable resin into concave portions of the mold by the capillary phenomenon by contacting one end of a mold with which a film substrate is closely brought into contact, with the ultraviolet ray-curable resin or heat-curable resin which is to be a core, it is desirable that a pressure of the this whole system is reduced (around 0.1 to 200 Pa). In place of reduction in a pressure of the whole system, the system may be sucked with a pump through a different end from one end of the mold contacting with the curable resin, or a pressure may be applied at one end contacting with the curable resin.

In addition, in order to promote filling, in place of or in addition to the aforementioned reduction in a pressure and application of a pressure, the viscosity of a curable resin is reduced by heating a curable resin contacting with one end of a mold, being effective means.

It is required that a refractive index of a cured ultraviolet ray-curable resin or heat-curable resin which is to be a core is larger than that of the film substrate (including a cladding layer in the following 5) step) which is to be a cladding, and is 1.53 or larger, preferably 1.55 or larger. A difference in refractive indices between a cladding (including a cladding layer in the following 5) step) and a core is 0.02 or larger, preferably 0.05 or larger.

When an ultraviolet ray-curable resin or a heat-curable resin is contacted with one end of concave portions for preparing a plurality of alignment marks formed on a mold, it is preferable to use mold such that the resin does not contact with the other end of the concave portion. This is because, when a resin is contacted with both ends of the concave portion, the resin does not introduce therein. For example, as shown in FIG. 2, concave portions for preparing a plurality of alignment marks formed on a mold is bent midway, so as to contact one end of each of concave portions 22a for preparing an optical waveguide and concave portions 22b for preparing a plurality of alignment marks formed on a mold 20 with an ultraviolet ray-curable resin or a heat-curable resin and, on the other hand, so as not to contact the other ends of these concave portions with an ultraviolet ray-curable resin or a heat-curable resin.

Figure 3:
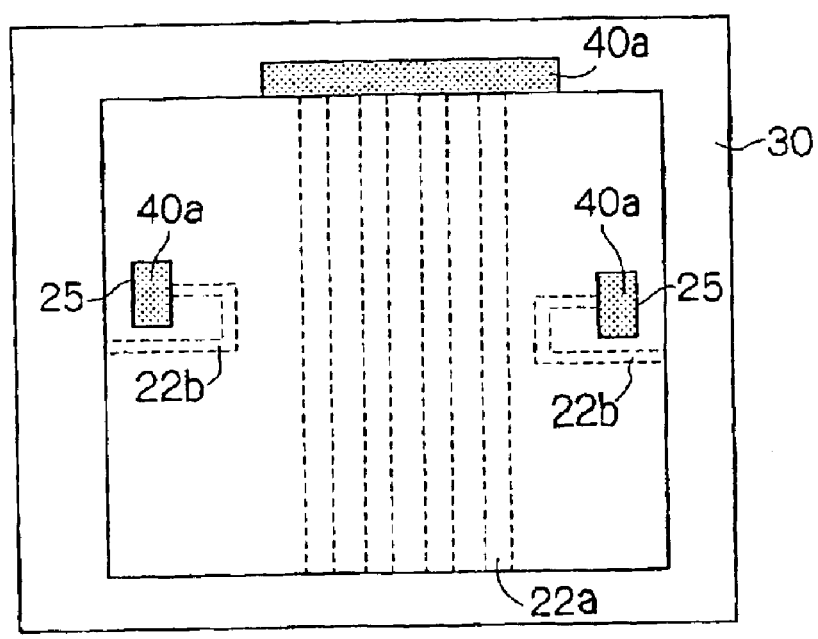
FIG. 3 is a conceptional view showing another example of a step of filling a resin for an optical waveguide and a plurality of alignment marks into concave portions of a mold.

In addition, in order that one end of concave portions for preparing a plurality of alignment marks is not contacted with an ultraviolet ray-curable resin or a heat-curable resin, as shown in FIG. 3, the following mold may be used: a notch is provided on a mold 30 so as to expose one end of concave portions 22b for preparing a plurality of alignment marks, and this notch is used as a resin reservoir 25, while the other end of concave portions 22b for preparing a plurality of alignment marks is not permitted to communicate with the aforementioned resin reservoir 25.

4) A step of curing the introduced ultraviolet ray-curable resin or heat-curable resin, and peeling a mold from a film substrate The introduced ultraviolet ray-curable resin or heat-curable resin is cured. In order to cure an ultraviolet ray-curable resin, an ultraviolet-ray lamp, an ultraviolet-ray LED, a UV irradiating apparatus and the like are used. In addition, in order to cure a heat-curable resin, heating in an oven is used.

Alternatively, a mold used in the aforementioned 1) to 3) steps may be used as it is in a cladding layer and, in this case, a mold need not to be peeled, and is utilized as it is as a cladding layer.

5) A step of forming a cladding layer on a film substrate on which a core is formed A cladding layer is formed on a film substrate on which a core is formed and, as a cladding layer, there are a film (for example, the film substrate used in the 2) step is used similarly), a layer obtained by coating and curing a curable resin (ultraviolet ray-curable resin, heat-curable resin), and a polymer membrane obtained by coating and drying a solution of a polymer material in a solvent. When a film is used as a cladding layer, the film is applied using an adhesive and, thereupon, it is desirable that a refractive index of an adhesive is near a refractive index of the film.

It is desirable that a refractive index of a cladding layer is smaller than 1.55, preferably smaller than 1.53 in order to maintain a difference in refractive indices between a core. In addition, it is preferable from a viewpoint of light confinement that a refractive index of a cladding layer is the same as a refractive index of the film substrate.

In a process of preparing a polymer optical waveguide of the invention, in particular, a combination using, as a mold material, a heat-curable silicone resin, inter alia, a heat-curable dimethylsiloxane resin, and using, as a film substrate, an alicyclic olefin resin having a norbornene structure on a main chain and having a polar group such as an alkyloxycarbonyl group on a side chain has the particularly high adherability between both resins, and can fill a curable resin into concave portions rapidly by the capillary phenomenon even when a cross-sectional area of a concave structure is extremely small (e.g. 10×10 $\mu$m rectangular).

Further, the aforementioned mold may be used as a cladding layer and, in that case, it is preferable that a refractive index of the mold is 1.5 or smaller, and the mold is oxone-treated in order to improve the adherability between the mold and a core material.

In addition, a film used for a cladding layer is applied on a glass plate having the same size and, after completion of alignment adjustment or after completion of an adhering step, a glass plate is peeled, whereby, the handling property upon alignment adjustment can be improved.

Second Method for Producing Polymer Optical Waveguide

Then, a second method for producing a polymer optical waveguide equipped with a plurality of alignment marks will be explained. The second process is a process of making a plurality of alignment marks by providing a plurality of notches on a mold, and imparting a material for a plurality of alignment marks to the surface of a film substrate through the notches. A method for producing a mold on which notches are provided includes a process of forming also convex portions for preparing a plurality of alignments on a master template, forming a layer of a mold-forming resin material on this master template so that convex portions for preparing alignments penetrate through the layer, peeling the resin material to form a mold and, then, cutting both ends of a mold so as to expose concave portions corresponding to convex portions for an optical waveguide formed on the mold. As a planar shape of a notch, in addition to a cross type, a wedge type and the like, a plurality of alignment marks to be attached to a photomask may be similarly applied.

As a method for producing convex portions for preparing alignment, a process of processing a member having a shape corresponding that of the convex portion from a material (metal, plastic etc.) which can be processed precisely, and applying the member to a master template with an adhesive is a simple process, being not limiting. In addition, it is necessary that a height of convex portions is greater than a thickness of a layer of a mold.

Figure 4:
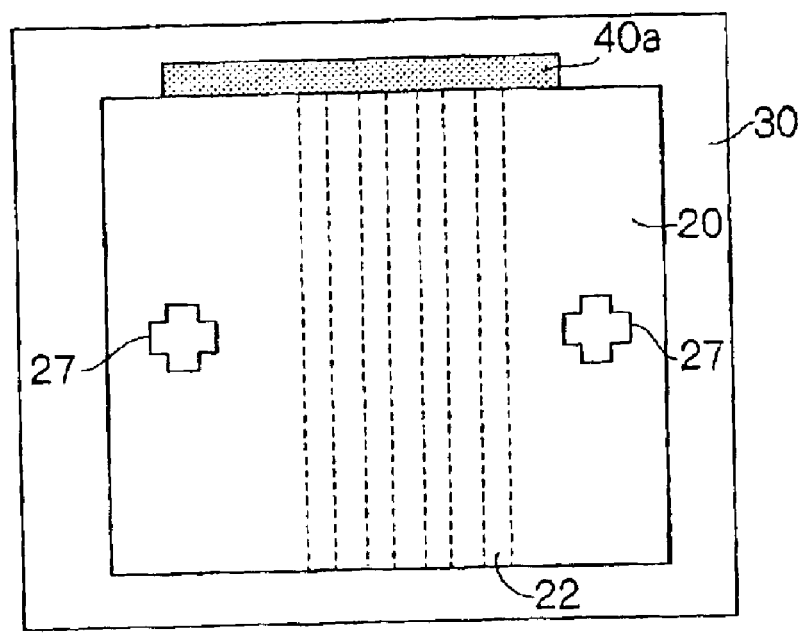
FIG. 4 is a conceptional view showing one example of a step of preparing a plurality of alignment marks through a notch provided on a mold.

FIG. 4 is a view showing adhesion of a mold on which a cross-type notch 27 is provided, to a film substrate, and contact of an ultraviolet ray-curable resin or a heat-curable resin 40a with one end of convex portions 22 for forming an optical waveguide formed on a mold.

Alternatively, as another process of providing a notch on a mold, a process of punching a mold into a prescribed shape may be also adopted.

After preparation of a mold, 2) a step of bringing a film used for a cladding layer having the better mold adherability into close contact with the mold, 3) a step of contacting one end of a mold with which a film used for a cladding layer is closely brought into contact, with an ultraviolet ray-curable resin or a heat-curable resin which is to be a core, and introducing the ultraviolet ray-curable resin or heat-curable resin into concave portions of the mold by the capillary phenomenon, 4) a step of imparting a material for a plurality of alignment marks to the surface of a film substrate through a notch formed on a mold, to form a plurality of alignment marks, 5) a step of curing the introduced ultraviolet ray-curable resin or heat-curable resin, and peeling a mold from a film used for a cladding layer, and 6) a step of forming a cladding layer on the film used for the cladding layer on which a core is formed, are performed.

The 2) and 3) steps are the same as the steps in the first process. In addition, as a material for a plurality of alignment marks in the 4) step, it is preferable to use a material which is optically distinguishable from a film substrate and, for example, a resin material, a dye, a pigment, a metal, and a mixture thereof are used. In addition, a method of imparting the material to the surface of a film substrate includes an ink jet method, a deposition method, a liquid droplet dropping method, a stamping method and the like. Further, the 6) step is the same as the 5) step in the first process.

Method for Producing Laminated Polymer Optical Waveguide

Then, a method for producing a laminated polymer optical waveguide will be explained. A laminated polymer waveguide is prepared by laminating the polymer optical waveguide equipped with a plurality of alignment marks prepared by the aforementioned process, utilizing a plurality of alignment marks. A plurality of alignment marks is easily distinguishable by an optical microscope.

It is preferable to use an adhesive for lamination, and examples of an adhesive include an ultraviolet ray-curable resin adhesive. It is desirable that an adhesive having an extremely small volume shrinking rate is selected.

Alternatively, it is possible to prepare a plurality of film substrates on which a core and a plurality of alignment marks are formed, and laminate them with a layer functioning as an adhesive layer and as a cladding layer. As this layer, an ultraviolet ray-curable resin is used.

When a polymer optical waveguide on which a cladding layer is formed in advance is laminated with an adhesive, since the number of steps is increased, but it is not necessary to regard the optical properties of an adhesive as important, a freedom degree of selection of the adhesive is improved, and it becomes possible to select an adhesive having an extremely small volume shrinking rate. Although there is demerit that an inflator to be added for decreasing a volume shrinking rate slightly reduces the light transmittance of that part, since a cladding layer is formed separately, a thickness of an adhesive layer can be minimized, and the demerit can be avoided. On the other hand, when lamination is performed with a layer functioning as an adhesive layer and as a cladding layer, the number of steps can be saved, but since the optical property of an ultraviolet ray-curable resin as a cladding layer is regarded as important, it becomes necessary to compromise with the performance such as a volume shrinking rate.

Alignment adjustment is usually performed while observing with an optical microscope from above an optical waveguide film and, when a plurality of alignment marks having a sufficient thickness can be prepared by a micromolding method and a positional tolerance to a light emitting device or a light receiving device is around 5 μm, it is possible to use a plurality of alignment marks itself as a datum surface. Like this, for example, an optical and electric substrate can be realized by laminating an optical waveguide film on a printed substrate without troublesome optical adjustment.

A light emitting part may be attached to the optical waveguide and laminated polymer optical waveguide prepared by invention. In order to increase an integrated degree of an integrated circuit, it is preferable that a plane emitting laser array (VCSEL) is used in a light emitting part.

Since a semiconductor laser device of a plane emitting laser array generates heat considerably, in order to prevent the adverse effect by heat generation, it is necessary to release the heat by retaining an interval between a semiconductor device and an edge of a core. Since a semiconductor laser beam has a spreading angle, when the aforementioned interval exceeds a limit, a spot diameter of the laser light at an edge of a core becomes larger than a diameter acceptable to a core (for example, when a core diameter is 50 μm, an acceptable diameter is 45 μm).

However, by taking a spot diameter of a semiconductor laser and a spreading angle of a laser beam in a plane emitting laser array into consideration, it is possible to increase a distance between a semiconductor laser and an edge of a core to such an extent that effect of heat generation can be sufficiently avoided, without provision of the aforementioned lens.

For example, a plane emitting laser array (manufacture by Fuji Xerox Co., Ltd., trade name: VCSEL-AM-0104) in which a spot diameter of a semiconductor laser is 10 μm, a beam spreading angle is 25° and an array interval is 250 μm is attached to an edge of a multiple mode polymer optical waveguide sheet having a core diameter of 50 μm, and since a spot diameter of the laser light at a core surface is accepted to around 45 μm, an interval between a semiconductor laser and a core edge is 79 μm at maximum. In addition, when a diameter of the laser light at a core edge is set at 30 μm, an interval between a semiconductor laser and a core edge becomes around 45 μm and, when this extent of an interval is realized, the heat can be sufficiently eliminated even when a temperature of a semiconductor laser device is elevated to about 100° C.

Therefore, a plane emitting laser array in which a spot diameter of a semiconductor laser is 1 to 20 μm, and a spreading angle of a laser beam is around 5° to 30° is preferably used and, in addition, an array interval is preferably around 100 to 500 μm. For example, VCSEL-AM-0104 and VCSEL-AM-0112 (all trade names) of Fuji Xerox Co., Ltd. are preferably used.

In addition, as the means for retaining an interval between a core edge of an optical waveguide sheet and a semiconductor laser of a plane emitting laser array as described above, it is enough to provide a frame at a sufficient height for maintaining the aforementioned interval, on a plane emitting laser array, and attachment of a frame to an optical waveguide sheet is performed by using an adhesive.

Figure 5A:
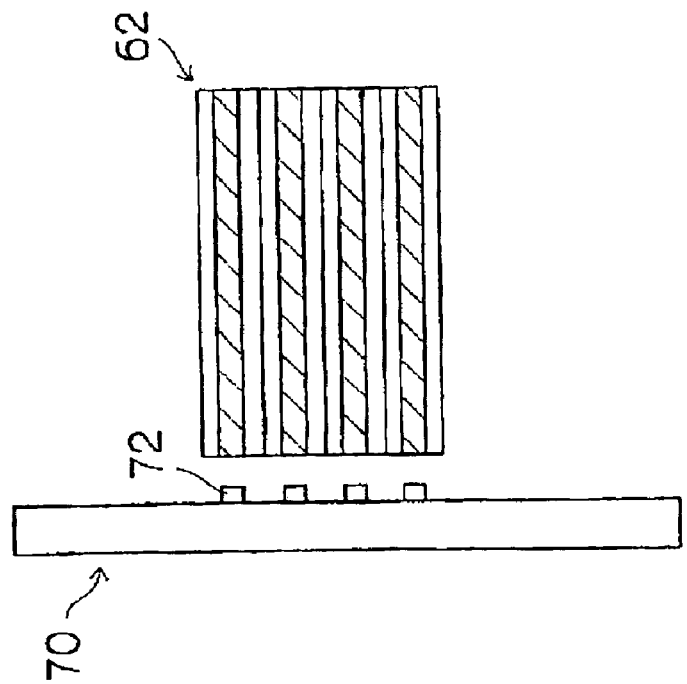
FIG. 5A is a conceptional view showing a side view of an attachment of a light emitting part to a laminated polymer optical waveguide.
Figure 5B:
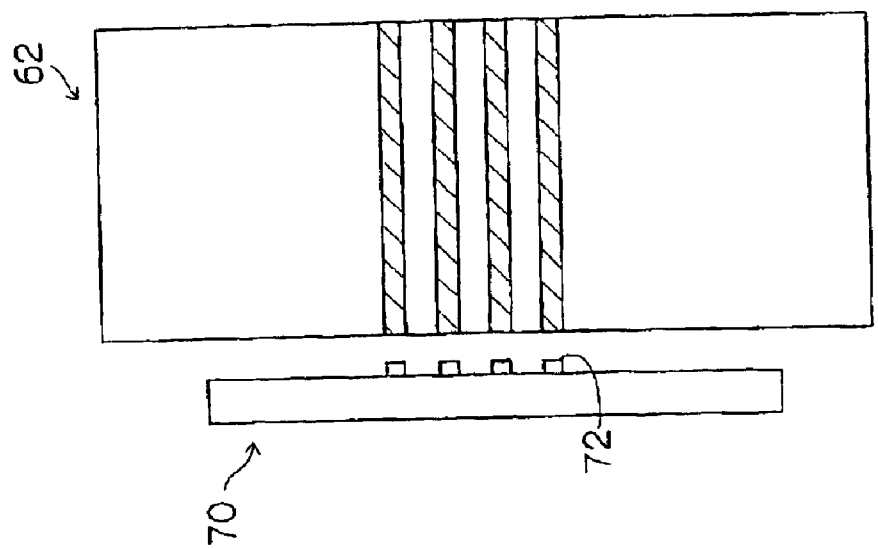
FIG. 5B is a conceptional view showing a top view of an attachment of a light emitting part to a laminated polymer optical waveguide.

FIGS. 5A and 5B are conceptional views showing an example in which a plane emitting laser array 70 (4×4 VCSEL) is directly connected to a laminated polymer optical waveguide 62 (in which four polymer optical waveguides having four cores are laminated). In the figures, 72 denotes a semiconductor laser device.

Figure 6:
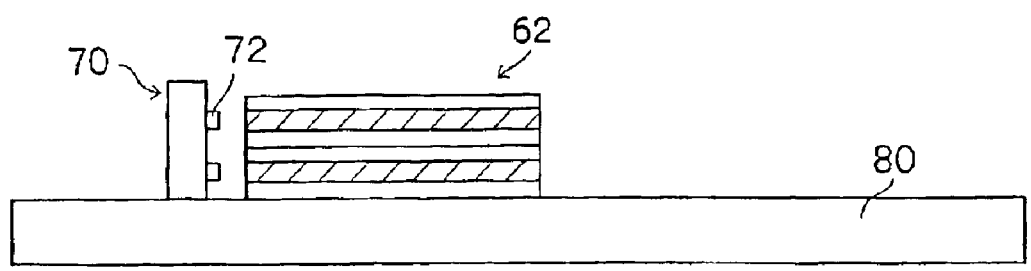
FIG. 6 is a conceptional view showing lamination of a printed substrate with a laminated polymer optical waveguide, and attachment of a light emitting part thereto.

In addition, FIG. 6 is a conceptional view showing an example in which a printed substrate 80 is laminated on a laminated polymer optical waveguide 62 (in which two polymer optical waveguides having four cores are laminated), and a plane emitting laser array 70 (4×2 VCSEL) is directly connected thereto. In the figure, 72 denote a semiconductor laser device.

In addition, the polymer optical waveguide and laminated polymer optical waveguide of the invention may be provided with a light receiving part in addition to a light emitting part. As a light emitting part, an optical diode array is preferably used. As a light diode array, arrays having the sensitivity in ultraviolet-ray having the same wavelength as that of a plane emitting laser array, and having the better sensitivity are preferable, such as Si photodiode array and GaAs photodiode array.

As a preferable embodiment, the present invention provides a method for producing a polymer optical waveguide equipped with a plurality of alignment marks according to claim 1, wherein the mold is such that, when the ultraviolet ray-curable resin or the heat-curable resin is contacted with one end of the concave portions for preparing a plurality of alignment marks formed on the mold, the resin does not contact other ends of the concave portions.

Another preferable embodiment of the present invention is a method for producing a polymer optical waveguide equipped with a plurality of alignment marks, said method comprising:

a step of forming of a mold-forming resin material layer on a master template, which has convex portions for an optical waveguide and convex portions for a plurality of alignment marks formed thereon, peeling the resin material and then cutting both ends of a mold so as to expose concave portions corresponding to convex portions for an optical waveguide and convex portions for alignment marks formed on the mold, to prepare said mold;

a step of bringing a film used for a cladding layer having mold adherability into close contact with the mold;

a step of contacting one end of the mold, with which the film used for the cladding layer is closely brought into contact, with an ultraviolet ray-curable resin or a heat-curable resin that will become a core, and then introducing the ultraviolet ray-curable resin or the heat-curable resin into the concave portions of the mold by capillary phenomenon;

a step of applying a material for alignment marks to a surface of the film substrate through notches formed on the mold, in order to provide alignment marks;

a step of curing the introduced ultraviolet ray-curable resin or heat-curable resin, and peeling the mold from the film used for the cladding layer; and a step of forming a cladding layer on the film used for the cladding layer on which the core is formed.

Still another preferable embodiment of the present invention is a method for producing a polymer optical waveguide equipped with a plurality of alignment marks according to claim 3, wherein the material used to form the alignment marks is a resin, a dye, a pigment, a metal or a combination of two or more of the same.

Still another preferable embodiment of the present invention is a method for producing a laminated polymer optical waveguide, said method comprising:

a step of forming of a mold-forming resin material layer on a master template, which has convex portions for an optical waveguide and convex portions for a plurality of alignment marks formed thereon, peeling the resin material and then cutting both ends of a mold so as to expose concave portions corresponding to convex portions for an optical waveguide and convex portions for alignment marks formed on the mold, to prepare said mold;

a step of bringing a film used for a cladding layer having mold adherability into close contact with the mold;

a step of contacting one end of the mold, with which the film used for the cladding layer is closely brought into contact, with an ultraviolet ray-curable resin or a heat-curable resin that will become a core, and then introducing the ultraviolet ray-curable resin or the heat-curable resin into the concave portions of the mold by capillary phenomenon;

a step of curing the introduced ultraviolet ray-curable resin or heat-curable resin, and peeling the mold from the film used for the cladding layer;

a step of forming a cladding layer on the film used for the cladding layer on which the core is formed; and a step of laminating a plurality of polymer optical waveguides, which utilize alignment marks provided by the above step.

Still another preferable embodiment of the present invention is a method for producing a laminated polymer optical waveguide, which comprises:

(1) a step of forming of a mold-forming resin material layer on a master template, which has convex portions for an optical waveguide and convex portions for a plurality of alignment marks formed thereon, peeling the resin material and then cutting both ends of a mold so as to expose concave portions corresponding to convex portions for an optical waveguide and convex portions for alignment marks formed on the mold, to prepare said mold;

(2) a step of bringing a film used for a cladding layer having mold adherability into close contact with the mold;

(3) a step of contacting one end of the mold, with which the film used for the cladding layer is closely brought into contact, with an ultraviolet ray-curable resin or a heat-curable resin that will become a core, and then introducing the ultraviolet ray-curable resin or the heat-curable resin into the concave portions of the mold by capillary phenomenon;

(4) a step of applying a material for alignment marks to a surface of the film substrate through notches formed on a mold to prepare alignment marks;

(5) a step of curing the introduced ultraviolet ray-curable resin or heat-curable resin, and peeling the mold from the film used for the cladding layer;

(6) a step of forming a cladding layer on the film used for the cladding layer on which the core is formed; and (7) a step of laminating a plurality of polymer optical waveguides, which utilize alignment marks provided by steps (1) to (6).

Still another preferable embodiment of the present invention is a method for producing a laminated polymer optical waveguide, which comprises producing a plurality of film substrates on which cores and a plurality of alignment marks are formed by repeating the following steps, and laminating them with a layer functioning as an adhesive layer and as a cladding layer utilizing alignment marks:

a step of forming of a mold-forming resin material layer on a master template, which has convex portions for an optical waveguide and convex portions for a plurality of alignment marks formed thereon, peeling the resin material and then cutting both ends of a mold so as to expose concave portions corresponding to convex portions for an optical waveguide and convex portions for alignment marks formed on the mold, to prepare said mold;

a step of bringing a film used for a cladding layer having mold adherability into close contact with the mold;

a step of contacting one end of the mold, with which the film used for the cladding layer is closely brought into contact, with an ultraviolet ray-curable resin or a heat-curable resin that will become a core, and then introducing the ultraviolet ray-curable resin or the heat-curable resin into the concave portions of the mold by capillary phenomenon; and a step of curing the introduced ultraviolet ray-curable resin or heat-curable resin, and peeling the mold from the film used for the cladding layer.

Still another preferable embodiment of the present invention is a method for producing a laminated polymer optical waveguide, which comprises producing a plurality of film substrates on which cores and a plurality of alignment marks are formed by repeating the following steps, and laminating them with a layer functioning as an adhesive layer and as a cladding layer utilizing alignment marks:

a step of forming of a mold-forming resin material layer on a master template, which has convex portions for an optical waveguide and convex portions for providing a plurality of alignment marks are formed, so that the convex portions penetrate through the layer, peeling the resin material and then cutting both ends of a mold so as to expose concave portions corresponding to convex portions for an optical waveguide and convex portions for alignment marks formed on the mold, to prepare said mold;

a step of bringing a film used for a cladding layer having mold adherability into close contact with the mold;

a step of contacting one end of the mold, with which the film used for the cladding layer is closely brought into contact, with an ultraviolet ray-curable resin or a heat-curable resin that will become a core, and then introducing the ultraviolet ray-curable resin or the heat-curable resin into the concave portions of the mold by capillary phenomenon;

a step of applying a material for alignment marks to a surface of the film substrate through notches formed on the mold, in order to provide alignment marks; and a step of curing the introduced ultraviolet ray-curable resin or heat-curable resin, and peeling the mold from the film used for the cladding layer.

In addition, the invention provides the method for producing a polymer optical waveguide or a laminated polymer optical waveguide equipped with a plurality of alignment marks, wherein the formation of a cladding layer is performed by coating and curing an ultraviolet ray-curable resin or a heat-curable resin.

In addition, the invention provides the method for producing a polymer optical waveguide or a laminated polymer optical waveguide equipped with a plurality of alignment marks, wherein the formation of a cladding layer is performed by laminating a cladding film with an adhesive having a refractive index close to that of the film.

In addition, the invention provides the method for producing a polymer optical waveguide or a laminated polymer optical waveguide equipped with a plurality of alignment marks, wherein the layer of a mold-forming resin material is a layer obtained by curing a curable silicone resin.

In addition, the invention provides the method for producing a polymer optical waveguide or a laminated polymer optical waveguide equipped with alignments, wherein the surface energy of the mold is 10 dyn/cm to 30 dyn/cm.

In addition, the invention provides the method for producing a polymer optical waveguide or a laminated polymer light waveguide equipped with a plurality of alignment marks described in any one of the above (1) to (12), wherein a Share rubber hardness of the mold is 15 to 80.

In addition, the invention provides the method for producing a polymer optical waveguide or a laminated polymer optical waveguide equipped with a plurality of alignment marks, wherein a surface roughness of the mold is 0.5 $\mu$m or smaller.

In addition, the invention provides the method for producing a polymer optical waveguide or a laminated polymer optical waveguide equipped with a plurality of alignment marks, wherein the light transmittance of the mold is 80% or larger at a region of 350 nm to 700 nm.

In addition, the invention provides the method for producing a polymer optical waveguide or a laminated polymer optical waveguide equipped with a plurality of alignment marks, wherein a thickness of the mold is 0.1 mm to 50 mm.

In addition, the invention provides the method for producing a polymer optical waveguide or a laminated polymer optical waveguide equipped with a plurality of alignment marks, wherein a refractive index of the film used for the cladding layer is 1.55 or smaller.

In addition, the invention provides the method for producing a polymer optical waveguide or a laminated polymer optical waveguide equipped with a plurality of alignment marks, wherein the film used for the cladding layer is an alicyclic acryl resin film.

In addition, the invention provides the method for producing a polymer optical waveguide or a laminated polymer optical waveguide equipped with a plurality of alignment marks, wherein the film used for the cladding layer is an alicyclic olefin resin film.

In addition, the invention provides the method for producing a polymer optical waveguide or a laminated polymer optical waveguide equipped with a plurality of alignment marks, wherein the alicyclic olefin resin film is a resin film having a norbornene structure on a main chain and a polar group on a side chain.

In addition, the invention provides the method for producing a polymer optical waveguide or a laminated polymer optical waveguide equipped with a plurality of alignment marks, wherein in the step of introducing an ultraviolet ray-curable resin or a heat-curable resin into concave portions of the mold by the capillary phenomenon, a pressure of the system is reduced.

In addition, the invention provides the method for producing a polymer optical waveguide or a laminated polymer optical waveguide equipped with a plurality of alignment marks, wherein the viscosity of the ultraviolet ray-curable resin or heat-curable resin is 10 mPa·s to 2000 mPa·s.

In addition, the invention provides the method for producing a polymer optical waveguide or a laminated polymer optical waveguide equipped with a plurality of alignment marks, wherein a change in a volume when the ultraviolet ray-curable resin or heat-curable resin is cured is 10% or smaller.

In addition, the invention provides the method for producing a polymer optical waveguide or a laminated polymer optical waveguide equipped with a plurality of alignment marks, wherein a refractive index of the cladding layer is the same as that of a film used for a cladding layer.

In addition, the invention provides the method for producing a polymer optical waveguide or a laminated polymer optical waveguide equipped with a plurality of alignment marks, wherein a diameter of a core is in the range of 10 $\mu$m to 500 $\mu$m.

In addition, the invention provides the method for producing a polymer optical waveguide or a laminated polymer optical waveguide equipped with a plurality of alignment marks, wherein the refractive index of a cured ultraviolet ray-curable resin or heat-curable resin is 1.55 or larger.

In addition, the invention provides the method for producing a polymer optical waveguide or a laminated polymer optical waveguide equipped with a plurality of alignment marks, wherein a difference between a refractive index of the film used for the cladding layer and a cladding layer and that of a core is 0.02 or larger.

EXAMPLES

The present invention will be specifically explained by way of Examples, but is not limited by them.

Example 1

Preparation of Polymer Optical Waveguide Equipped with a Plurality of Alignment Marks MicroChem, Inc.*, A thick resist (manufactured by MicroChem, Inc., trade name: SU-8) is coated on a Si substrate by a spin coating method, pre-baked at 80° C., exposed to the light through a photomask, and developed to form convex portions for four optical waveguides having a cross-section of a square (width: 50 μm, height: 50 μm, length: 150 mm), and convex portions for two alignment marks having a planer shape and a cross-section of a square (width: 50 μm, height: 50 μm, length of one side: 5 mm) as shown by FIGS. 1A–2. Then, this is post-baked at 120° C. to prepare a master template for preparing an optical waveguide core.

Then, a releasing agent is coated on this master template, a heat-curable dimethylsiloxane resin (manufactured by Dow Corning Asia Ltd., trade name: SYLGARD184) is cast therein, heated at 120° C. for 30 minutes to solidify, and peeled, to prepare a mold (thickness of mold: 3 mm) having concave portions corresponding to convex portions for an optical waveguide and a plurality of alignment marks having a cross-section of a square. Further, both ends of the mold are cut to make an input and output part for the following ultraviolet ray-curable resin, to obtain a mold.

This mold and a film substrate (Arton film, manufactured by JSR Corporation, refractive index 1.510) having a thickness of 188 μm which is larger in size than the mold are adhered. Then, a few droplets of an ultraviolet ray-curable resin (manufactured by JSR Corporation, trade name: PJ3001) having the viscosity of 1300 mPa·s are dropped to each one end of concave portions for preparing an optical waveguide and each end of concave portions for preparing a plurality of alignment marks formed on a mold (see FIG. 2), and an ultraviolet ray-curable resin is filled into the aforementioned each concave portion by the capillary phenomenon. Then, the UV light at 50 mW/cm² is irradiated for 5 minutes through a mold to cure the resin. When a mold is peeled from a film substrate, a core and a plurality of alignment marks having the same shape as that of the master template convex portion are formed on a film substrate. A refractive index of a core and a plurality of alignment marks is 1.591.

Then, an ultraviolet ray-curable resin (manufactured by JSR Corporation) having a refractive index after curing of 1.510 identical to that of a substrate film (Arton film) is coated on the whole core-forming surface of a substrate film, and the UV light at 50 mW/cm² is irradiated for 10 minutes to cure the resin (thickness after curing: 10 μm) to form a cladding layer. A flexible polymer optical waveguide is obtained.

Preparation of Laminated Polymer Optical Waveguide

An ultraviolet ray-curable resin having little volume shrinkage is coated on the polymer optical waveguide prepared as described above at an extremely small thickness, another polymer optical waveguide prepared similarly is laminated thereon, relative positions of two polymer optical waveguide are adjusted with a microscope optical system using a plurality of alignment marks (since a refractive index is different from that of a film substrate, the mark is distinguishable even when transparent) from above the laminate, the UV light at 50 mW/cm² is irradiated for 1 minute to solidify, to prepare a flexible laminated polymer optical waveguide. An error of relative positions of the laminated polymer optical waveguides is within 1 μm or smaller.

This step is repeated and, finally, an unnecessary part is cut with a dicing saw to prepare an optical waveguide film having four optical waveguides per one layer and in which those four layers are laminated. 4×4 VCSEL is directly connected to this laminated polymer optical waveguide.

Example 2

Preparation of Polymer Optical Waveguide Equipped with a Plurality of Alignment Marks A thick resist (manufactured by MicroChem, Inc., trade name: SU-8) is coated on a Si substrate by a spin coating method, pre-baked at 80° C., exposed to the light through a photomask, and developed to form convex portions for four optical waveguides having a cross-section of a square (width: 50 μm, height: 50 μm, length: 150 mm). Then, this is post-baked at 120° C. Then, to this are adhered (see FIG. 4) two convex portions for preparing an alignment (a height of a convex is 4 mm) having a planar shape of a cross-type (see FIG. 4) prepared by a micro electric discharge processes, to prepare a master template.

Then, a releasing agent is coated on this master template, a heat-curable dimethylsiloxane resin (manufactured by Dow Corning Asia Ltd., trade name: SYLGARD184) is cast therein, heated at 120° C. for 30 minutes to solidify, and peeled, to prepare a mold (thickness of mold: 3 mm) having the aforementioned concave portions corresponding to convex portions having a cross-section of a square and the aforementioned notch having a cross-type shape. Further, both ends of the mold are cut to make an input and output part for the following ultraviolet ray-curable resin, to obtain a mold.

This mold and an Arton film substrate (thickness of 188 μm) which is larger in size than the mold are closely brought into contact with, a few droplets of an ultraviolet ray-curable resin (manufactured by NTT Advanced Technology Corporation) having the viscosity of 500 mPa·s are dropped to an input and output part at an end of a mold. In addition, another end of an input and output part of a mold is sucked with a diaphragm sucking pump (maximum sucking pressure 33.25 KPa), and the ultraviolet-curable resin is filled into the concave portion by the capillary phenomenon. Thereafter, the UV light at 50 mW/cm² is irradiated for 10 minutes through a mold to cure the resin.

Then, a black pigment dispersion is coated from an ink jet head through notches of a mold, the coated dispersion is dried, and a mold is peeled. Convex portions for four optical waveguides and two black cross-type alignment marks (thickness: 0.5 μm) are formed on a film substrate.

Further, an ultraviolet ray-curable resin (manufactured by NTT Advanced Technology Corporation, epoxy series) having a refractive index of 1.510 identical to that of a film substrate (Arton film) is coated on an optical waveguide-forming surface of a film substrate, and the UV light at 50 mW/cm² is irradiated for 10 minutes to solidify, to form a side and an upper cladding layer (thickness after curing: 10 μm). A flexible polymer optical waveguide is prepared.

Preparation of Laminated Polymer Optical Waveguide

Then, four laminated polymer optical waveguides are prepared as in Example 1, and 4×4 VCSEL is directly connected to those waveguides.

Example 3

From a step of preparing a master template to a step of forming a core and a plurality of alignment marks on Arton film are performed according to the same manner as that of Example 1 except that a thickness of each alignment mark is 100 μm. Then, an ultraviolet ray-curable resin (manufactured by JSR Corporation) having a refractive index after curing of 1.510 identical to that of a substrate film (Arton film) is coated on a core-forming surface of a substrate film by limiting to a side cladding coating region so that a plurality of alignment marks is not covered, and the UV light at 50 mW/cm² is irradiated for 10 minutes to cure the resin (thickness after curing 10 μm). A flexible polymer optical waveguide is obtained.

An ultraviolet ray-curable resin having little volume shrinkage is coated extremely thinly on a surface, on which a waveguide and a plurality of alignment marks are formed, of the thus prepared polymer optical waveguide film. This is laminated on a printed substrate while attaching a plurality of alignment marks to a pin separately provided on a printed substrate, and the UV light at 50 mW/cm² is irradiated for 1 minute to cure the resin, to form an optical and electric substrate. Since a relative positional error of a laminated waveguide is 5 μm or smaller, there is no effect of positional shift on VCSEL and, thus, the better performance is exerted.

Since preparation of a polymer optical waveguide equipped with a plurality of alignment marks of the invention needs only use of a master template on which convex portions for a plurality of alignment marks like convex portions for an optical waveguide is formed, or provision of a notch on a mold, a complicated step for preparing a plurality of alignment marks is not necessary. Since a polymer optical waveguide prepared by the process of the invention is equipped with a plurality of alignment marks, a polymer optical waveguide can be laminated at a small error.

Further, a method for producing a polymer optical waveguide of the invention has an extremely simplified preparing step, and can prepare a polymer optical waveguide easily and, thus, the process enables a polymer optical waveguide to be prepared at the extremely low cost, as compared with the previous method for producing a polymer optical waveguide. In addition, according to the method for producing a polymer optical waveguide of the invention, a flexible polymer optical waveguide which has small loss and high precision, and can be arbitrarily installed into various apparatuses can be obtained. Further, a shape of a polymer optical waveguide can be arbitrarily set.

What is claimed is:

1. A method for producing a polymer optical waveguide equipped with a plurality of alignment marks, said method comprising:

a step of forming of a mold-forming resin material layer on a master template, which has convex portions for an optical waveguide and convex portions for a plurality of alignment marks formed thereon, peeling the resin material and then culling both ends of a mold so as to expose concave portions corresponding to convex portions for an optical waveguide and convex portions for alignment marks formed on the mold, to prepare said mold;

a step of bringing a film used for a cladding layer having mold adherability into close contact with the mold;

a step of contacting one end of the mold, with which the film used for the cladding layer is closely brought into contact, with an ultraviolet ray-curable resin or a heat-curable resin that will become a core, and then introducing the ultraviolet ray-curable resin or the heat-curable resin into the concave portions of the mold by capillary phenomenon;

a step of curing the introduced ultraviolet ray-curable resin or heat-curable resin, and peeling the mold from the film used for the cladding layer; and a step of forming a second cladding layer on the film used for the cladding layer on which the core is formed.

2. A method for producing a polymer optical waveguide equipped with a plurality of alignment marks according to claim 1, wherein the mold is such that, when the ultraviolet ray-curable resin or the heat-curable resin is contacted with one end of the concave portions for preparing a plurality of alignment marks formed on the mold, the resin does not contact other ends of the concave portions.

3. A method for producing a polymer optical waveguide equipped with a plurality of alignment marks, said method comprising:

a step of forming of a mold-forming resin material layer on a master template, which has convex portions for an optical waveguide and convex portions for a plurality of alignment marks formed thereon, peeling the resin material and then cutting both ends of a mold so as to expose concave portions corresponding to convex portions for an optical waveguide and convex portions for alignment marks formed on the mold, to prepare said mold;

a step of bringing a film used for a cladding layer having mold adherability into close contact with the mold;

a step of contading one end of the mold, with which the film used for the cladding layer is closely brought into contact, with an ultraviolet ray-curable resin or a heat-curable resin that will become a core, and then introducing the ultraviolet ray-curable resin or the heat-curable resin into the concave portions of the mold by capillary phenomenon;

a step of applying a material for alignment marks to a surface of the film substrate through notches formed on the mold, in order to provide alignment marks;

a step of curing the introduced ultraviolet ray-curable resin or heat-curable resin, and peeling the mold from the film used for the cladding layer; and a step of forming a second cladding layer on the film used for the cladding layer on which the core is formed.

4. A method for producing a polymer optical waveguide equipped with a plurality of alignment marks according to claim 3, wherein the material used to form the alignment marks is a resin, a dye, a pigment, a metal or a combination of two or more of the same.

5. A method for producing a laminated polymer optical waveguide, said method comprising:

a step of forming of a mold-forming resin material layer on a master template, which has convex portions for an optical waveguide and convex portions for a plurality of alignment marks formed thereon, peeling the resin material and then cutting both ends of a mold so as to expose concave portions corresponding to convex portions for an optical waveguide and convex portions for alignment marks formed on the mold, to prepare said mold;

a step of bringing a film used for a cladding layer having mold adherability into close contact with the mold;

a step of contacting one end of the mold, with which the film used for the cladding layer is closely brought into contact, with an ultraviolet ray-curable resin or a heat-curable resin that will become a core, and then introducing the ultraviolet ray-curable resin or the heat-curable resin into the concave portions of the mold by capillary phenomenon;

a step of curing the introduced ultraviolet ray-curable resin or heat-curable resin, and peeling the mold from the film used for the cladding layer;

a step of forming a second cladding layer on the film used for the cladding layer on which the core is formed; and a step of laminating a plurality of polymer optical waveguides, which utilize alignment marks provided by the above step.

6. A method for producing a laminated polymer optical waveguide, which comprises:

(1) a step of fanning of a mold-fanning resin material layer on a master template, which has convex portions for an optical waveguide and convex portions for a plurality of alignment marks fonned thereon, peeling the resin material and then cutting both ends of a mold so as to expose concave portions corresponding to convex portions for an optical waveguide and convex portions for alignment marks formed on the mold, to prepare said mold;

(2) a step of bringing a film used far a cladding layer having mold adherability into close contact with the mold;

(3) a step of contacting one end of the mold, with which the film used for the cladding layer is closely brought into contact, with an ultraviolet ray-curable resin or a heat-curable resin that will become a core, and then introducing the ultraviolet ray-curable resin or the heat-curable resin into the concave portions of the mold by capillary phenomenon;

(4) a step of applying a material for alignment marks to a surface of the film substrate through notches formed on a mold to prepare alignment marks;

(5) a step of curing the introduced ultraviolet ray-curable resin or heat-curable resin, and peeling the mold from the film used for the cladding layer;

(6) a step of fanning a second cladding layer on the film used for the cladding layer on which the care is fanned; and (7) a step of laminating a plurality of polymer optical waveguides, which utilize alignment marks provided by steps (1) to (6).

7. A method for producing a laminated polymer optical waveguide, which comprises producing a plurality of film substrates on which cares and a plurality of alignment marks are formed by repeating the following steps, and laminating them with a layer functioning as an adhesive layer and as a cladding layer utilizing alignment marks:

a step of forming of a mold-forming resin material layer on a master template, which has convex portions for an optical waveguide and convex portions for a plurality of alignment marks formed thereon, peeling the resin material and then cutting both ends of a mold so as to expose concave portions corresponding to convex portions for an optical waveguide and convex portions for alignment marks formed on the mold, to prepare said mold;

a step of bringing a film used for the cladding layer having mold adherability into close contact with the mold;

a step of contacting one end of the mold, with which the film used for the cladding layer is closely brought into contact, with an ultraviolet ray-curable resin or a heat-curable resin that will become a core, and then introducing the ultraviolet ray-curable resin or the heat-curable resin into the concave portions of the mold by capillary phenomenon; and a step of curing the introduced ultraviolet ray-curable resin or heat-curable resin, and peeling the mold from the film used for the cladding layer.

8. A method for producing a laminated polymer optical waveguide, which comprises producing a plurality of film substrates on which cores and a plurality of alignment marks are formed by repeating the following steps, and laminating them with a layer functioning as an adhesive layer and as a cladding layer utilizing alignment marks:

a step of forming of a mold-forming resin material layer on a master template, which has convex portions for an optical waveguide and convex portions for providing a plurality of alignment marks are formed, so that the convex portions penetrate through the layer, peeling the resin material and then cutting both ends of a mold so as to expose concave portions corresponding to convex portions for an optical waveguide and convex portions for alignment marks formed on the mold, to prepare said mold;

a step of bringing a film used for the cladding layer having mold adherability into close contact with the mold;

a step of contacting one end of the mold, with which the film used for the cladding layer is closely brought into contact, with an ultraviolet ray-curable resin or a heat-curable resin that will become a core, and then introducing the ultraviolet ray-curable resin or the heat-curable resin into the concave portions of the mold by capillary phenomenon;

a step of applying a material for alignment marks to a surface of the film substrate through notches formed on the mold, in order to provide alignment marks; and a step of curing the introduced ultraviolet ray-curable resin or heat-curable resin, and peeling the mold from the film used for the cladding layer.

* * * * *